United States Patent [19]
Funaki et al.

[11] Patent Number: 5,737,573
[45] Date of Patent: Apr. 7, 1998

[54] ASYNCHRONOUS ACCESS SYSTEM HAVING AN INTERNAL BUFFER CONTROL CIRCUIT WHICH INVALIDATES AN INTERNAL BUFFER

[75] Inventors: Jun Funaki; Akira Kabemoto; Hirohide Sugahara, all of Kawasaki, Japan

[73] Assignee: Fujitsu Limited, Kawasaki, Japan

[21] Appl. No.: 733,721

[22] Filed: Oct. 16, 1996

Related U.S. Application Data

[63] Continuation of Ser. No. 139,746, Oct. 22, 1993, abandoned.

[30] Foreign Application Priority Data

Oct. 27, 1992 [JP] Japan ................... 4-288685

[51] Int. Cl.⁶ .................................................. G06F 12/12
[52] U.S. Cl. .................................. 395/486; 395/462
[58] Field of Search ............................ 395/460, 462, 395/474, 486, 457

[56] References Cited

U.S. PATENT DOCUMENTS

| | | | |
|---|---|---|---|
| 4,167,782 | 9/1979 | Joyce et al. | 395/468 |
| 4,571,672 | 2/1986 | Hatada et al. | 395/479 |
| 5,297,222 | 3/1994 | Mori et al. | 382/318 |
| 5,377,324 | 12/1994 | Kabemoto et al. | 395/475 |
| 5,404,483 | 4/1995 | Stamm et al. | 395/471 |
| 5,410,650 | 4/1995 | Sasaki et al. | 395/200.2 |

*Primary Examiner*—Tod R. Swann
*Assistant Examiner*—Kevin L. Ellis
*Attorney, Agent, or Firm*—Staas & Halsey

[57] ABSTRACT

An asynchronous access system includes a system bus, at least one processing module provided with a main memory, a central processing unit and a first connection unit which connects to the system bus, and at least one shared memory module provided with a shared memory unit and a second connection unit which connects to the system bus. The first connection unit within the processing module makes a block read request to the shared memory module via the system bus when the first connection unit recognizes a read from the shared memory module requested from the central processing unit. The first connection unit within the processing module comprises an internal bus, an internal buffer storing data read from the shared memory module, a system bus control circuit coupled to the system bus, an internal bus control circuit coupled to the central processing unit via the internal bus, and an internal buffer control circuit controlling write/read of the internal buffer based on a signal from the internal bus control circuit. One of the internal buffer control circuit and the internal bus control circuit invalidates a content of the internal buffer when one of a plurality of invalidating conditions is satisfied.

8 Claims, 13 Drawing Sheets

ASYNCHRONOUS ACCESS SYSTEM HAVING AN INTERNAL BUFFER CONTROL CIRCUIT WHICH INVALIDATES AN INTERNAL BUFFER

This application is a continuation of application Ser. No. 08/139,746, filed Oct. 22, 1993, now abandoned.

BACKGROUND OF THE INVENTION

The present invention generally relates to asynchronous access systems for shared memories, and more particularly to an asynchronous access system which is applicable to a computer system in which processing modules and a shared memory module are coupled via a system bus and wherein the processing module makes an access request of a read instruction with respect to the shared memory module via the system bus.

A computer system may include one or a plurality of processing modules and one or a plurality of shared memory modules which are coupled via a system bus. The processing module typically includes a central processing unit and a connection unit which connects to the system bus. On the other hand, the shared memory module typically includes a shared memory unit and a connection unit which connects to the system bus. In such a computer system, if the processing module employs a synchronous access system and makes direct access to an address space of the shared memory module existing in a physical address space of the processing module via the system bus, the data transfer via the system bus is made in units of one word in synchronism with one access instruction.

Accordingly, if a large number of processing modules are connected to the system bus and the synchronous access system for the share memory is employed, the access frequency to the system bus increases. For this reason, in order to improve the performance of the system by increasing the access speed to the shared memory module and reducing the overhead of the system bus, it is necessary for the processing module to make asynchronous access to the shared memory module. In addition, the asynchronous access system for the shared memory must enable reduction in the processing of the central processing unit within the processing module by using as much hardware processing as possible to make the valid/invalid judgement and invalidation of the content of an internal buffer within the processing module which stores the data read out from the shared memory module.

An asynchronous access system applicable to the computer system described above was previously proposed in a U.S. patent application Ser. No. 856,916 filed Sep. 18, 1991 in which the assignee is common to the assignee of the present application. According to this proposed asynchronous access system, an internal buffer is provided in the connection unit within the processing module. When the connection unit recognizes a read instruction from the central processing unit to the shared memory module, a block read request is made to the shared memory module via the system bus.

The shared memory module which receives the block read request from the connection unit within the processing module reads from the shared memory module data amounting to one block and made up of a predetermined number of continuous words including one word of access address. The read data are transmitted to the processing module via the system bus.

The processing module receives the data amounting to one block and stores the data in an internal buffer within the connection unit. Then, out of the data stored in the internal buffer, the data corresponding to the read instruction from the central processing unit is transmitted to the central processing unit. Hence, it is possible to reduce the overhead of the system bus and to read from the shared memory module at a high speed.

According to the proposed asynchronous access system described above, the content of the internal buffer within the connection unit is invalidated when the data processing of the central processing unit of the processing module ends, however, this invalidation is carried out by the central processing unit which executes an internal buffer invalidating instruction. For this reason, there is an overhead in that the software which operates within the processing module must execute the internal buffer invalidating instruction for every predetermined processing unit so as to invalidate the content of the internal buffer within the connection unit, and the load on the central processing unit is large.

On the other hand, in the proposed asynchronous access system, if the software does not execute the internal buffer invalidating instruction after the data from the shared memory module is stored in the internal buffer, the data from the shared memory module continues to be held within the internal buffer. Hence, when the software reads the content of the shared memory module after a long time elapses, the access address by chance may match the previous access address in which case the data stored in the internal buffer will be read out.

Because the data stored in the shared memory module can be read by and the data may be stored in the shared memory module from each processing module, there is a possibility that content of the data stored in the shared memory unit and the data stored in the internal buffer within the connection unit of the processing module may not match after a long time elapses. If such data which do not match are used, there is a possibility of destroying the data of the computer system.

SUMMARY OF THE INVENTION

Accordingly, it is a general object of the present invention to provide a novel and useful asynchronous access system in which the problems described above are eliminated.

Another and more specific object of the present invention is to provide an asynchronous access system comprising a system bus, at least one processing module provided with a main memory, a central processing unit and a first connection unit which connects to the system bus, and at least one shared memory module provided with a shared memory unit and a second connection unit which connects to the system bus, where the first connection unit within the processing module makes a block read request to the shared memory module via the system bus when the first connection unit recognizes a read from the shared memory module requested from the central processing unit, the first connection unit within the processing module comprises an internal bus, an internal buffer storing data read from the shared memory module, a system bus control circuit coupled to the system bus, an internal bus control circuit coupled to the central processing unit via the internal bus, and an internal buffer control circuit controlling write/read of the internal buffer based on a signal from the internal bus control circuit, and one of the internal buffer control circuit and the internal bus control circuit invalidates a content of the internal buffer when one of a plurality of invalidating conditions is satisfied. According to the asynchronous access system of the present invention, a plurality of invalidating functions are realized by hardware, so as to reduce the invalidating process carried out by the software of the central processing unit within the processing module. As a result, it is possible to reduce the overhead of the software, and prevent a serious fault such as data destruction from occurring in the computer system which makes the block read from the shared memory module.

Other objects and further features of the present invention will be apparent from the following detailed description when read in conjunction with the accompanying drawings.

DESCRIPTION OF THE PREFERRED EMBODIMENTS

First, a description will be given of the operating principle of the present invention, by referring to FIG. 1.

Figure 1:
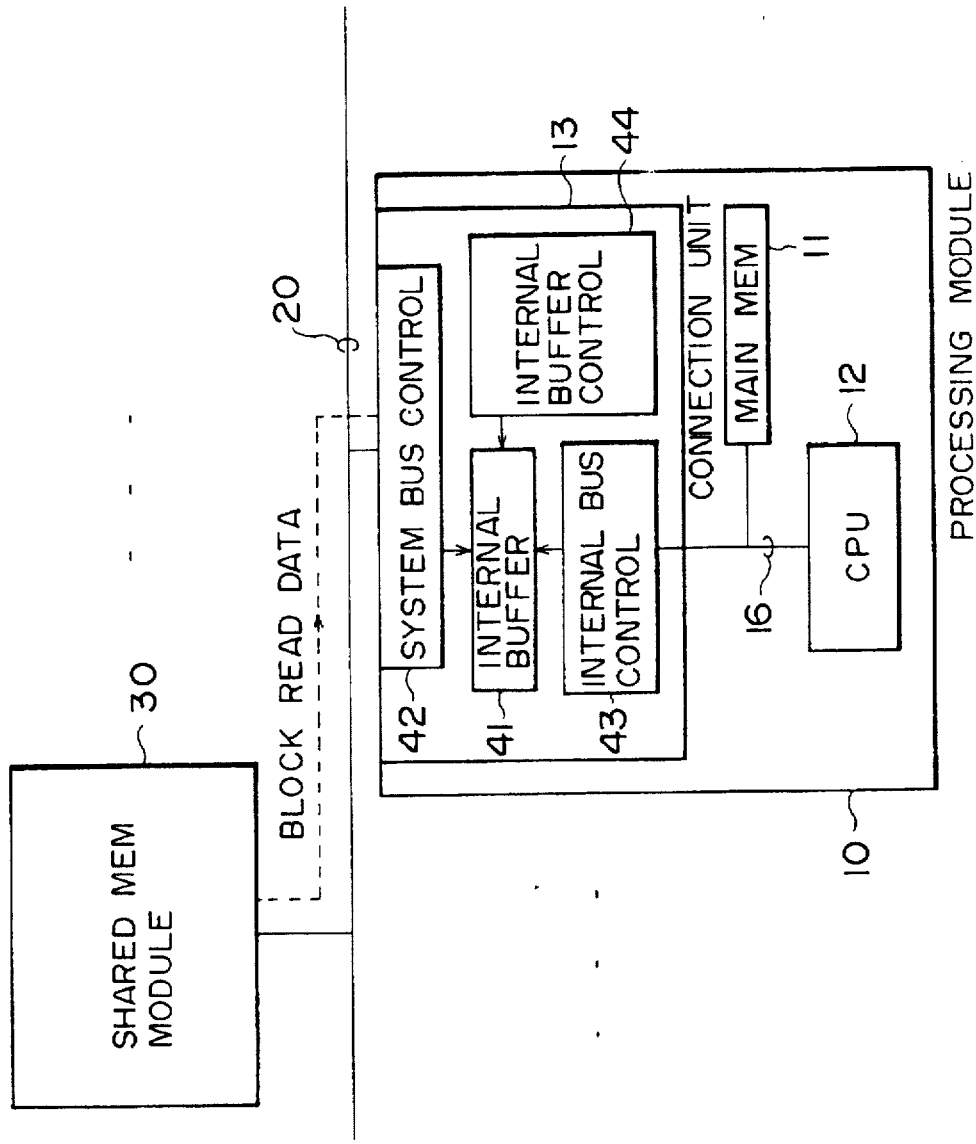
FIG. 1 is a system block diagram for explaining the operating principle of the present invention.

A computer system shown in FIG. 1 includes one or a plurality of processing modules 10 and one or a plurality of shared memory modules 30 which are coupled via a system bus 20, however, only one of each is shown in FIG. 1. The processing module 10 at least includes a main memory 11, a central processing unit (CPU) 12 and a connection unit 13 which connects to the system bus 20. The shared memory module 30 at least includes a shared memory unit (not shown) and a connection unit (not shown) which connects to the system bus 20.

When the connection unit 13 within the processing module 10 recognizes a read from the shared memory module 30 by the CPU 12, a block read request is made to the shared memory module 30 via the system bus 20 according to the asynchronous access system.

The connection unit 13 at least includes an internal buffer 41, a system bus control circuit 42, an internal bus control circuit 43, and an internal buffer control circuit 44. The internal buffer 41 stores the data read from the shared memory module 30. The system bus control circuit 42 connects to the system bus 20. The internal bus control circuit 43 connects to the CPU 12 via an internal bus 16. The internal buffer control circuit 44 carries out write/read control with respect to the internal buffer 41 based on a signal from the internal bus control circuit 43. The content of the internal buffer 41 is invalidated by one of the internal buffer control circuit 44 and the internal bus control circuit 43 when one of a plurality of invalidating conditions is satisfied.

In the present invention, when the connection unit 13 recognizes the read from the shared memory module 30 by the CPU 12, the connection unit 13 makes a block read request to the shared memory module 30 via the system bus 20. The block data read from the shared memory unit of the shared memory module 30 in response to this block read request is stored in the internal buffer 41 via the system bus 20 and the system bus control circuit 42.

The data stored in the shared memory unit of the shared memory module 30 are used in common by one or a plurality of processing modules 10, and the data required by one process are stored in address regions which are continuous to a certain extent. For this reason, when the data in the continuous address regions including the read address of the CPU 12 and amounting to a predetermined number of words are read from the shared memory unit of the shared memory module 30 as the data amounting to one block and stored in the internal buffer 41, and the connection unit 13 thereafter recognizes the read from the next address of the shared memory unit by the CPU 12, it is possible to respond at a high speed by transmitting the corresponding data from the internal buffer 41 to the CPU 12.

If the access addresses from the CPU 12 for reading the stored data of the shared memory unit from the internal buffer 31 become discontinuous, the internal buffer control circuit 44 regards that the series of data processing by the CPU 12 has ended, and invalidates the content of the internal buffer 41. As a result, the internal buffer 41 becomes ready to accept a new access after this invalidating process.

After the series of data processing by the CPU 12 ends and the next series of data processing is to be carried out, a preparation or preprocessing for the data processing must be made, and it takes time until the next read from the shared memory unit is started. Hence, the internal buffer control circuit 44 judges that the CPU 12 has ended the series of data processing and invalidates the content of the internal buffer 41 if the CPU 12 does not read the content of the internal buffer 41 for a set time.

Furthermore, if the CPU 12 carries out another operation via the connection unit 13, such as a write to the shared memory module 30, the internal bus control circuit 43 judges that the series of data processing has ended and invalidates the content of the internal buffer 41.

Therefore, according to the present invention, a plurality of invalidating functions are provided by the internal buffer control circuit 44 or the internal bus control circuit 43. As a result, it is possible to reduce the invalidating process carried out by the software of the CPU 12.

Figure 2:
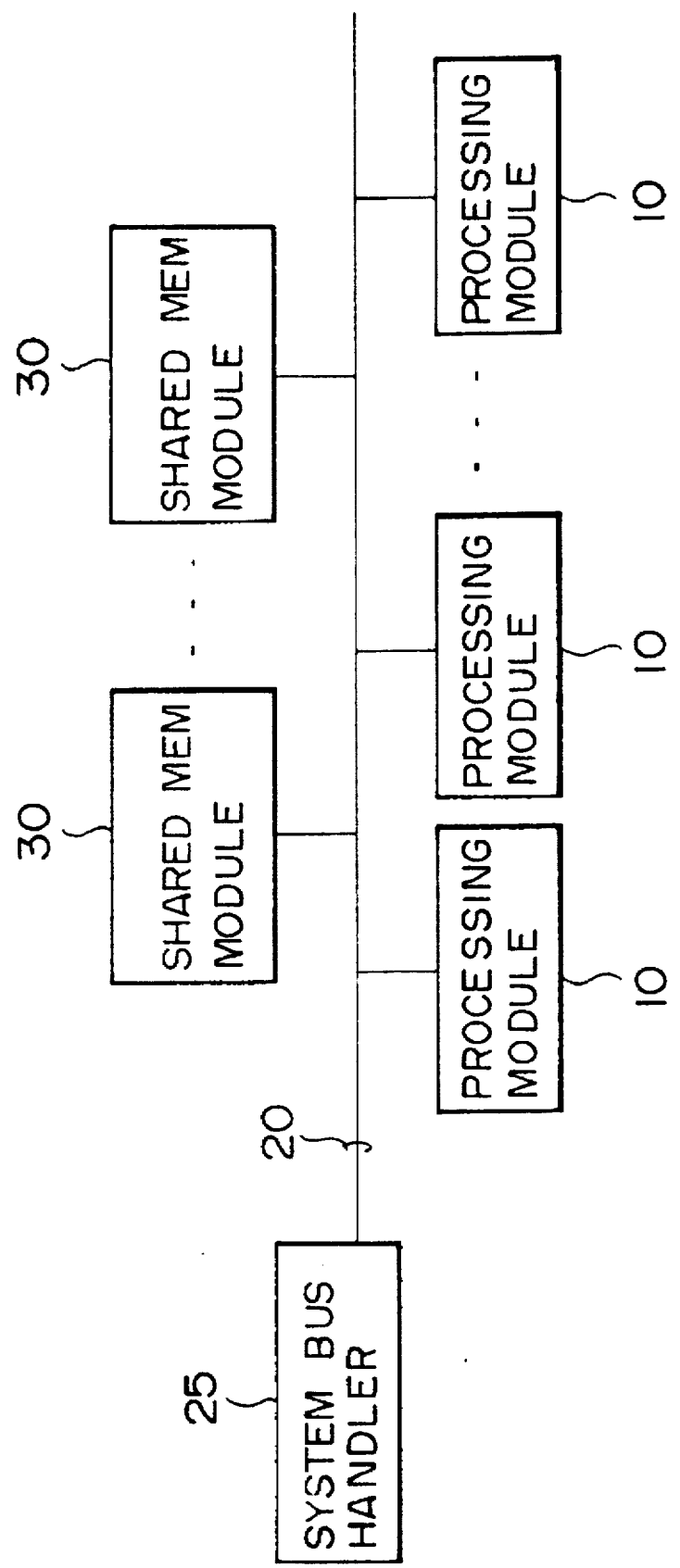
FIG. 2 is a system block diagram showing a computer system to which the present invention is applied.

FIG. 2 shows the construction of a computer system to which the present invention is applied. The computer system shown in FIG. 2 is the so-called multi-processor system including a plurality of processing modules 10 and a plurality of shared memory modules 30 which are coupled via a shared system bus 20. A system bus handler 25 carries out centralized control of the arbitration of the system bus 20. Only one system bus 20 is shown in FIG. 2, however, it is possible to provide a plurality of system buses. If a plurality of system buses are provided, the processing modules 10 and the shared memory modules 30 may be coupled via the plurality of independent system buses.

Figure 3:
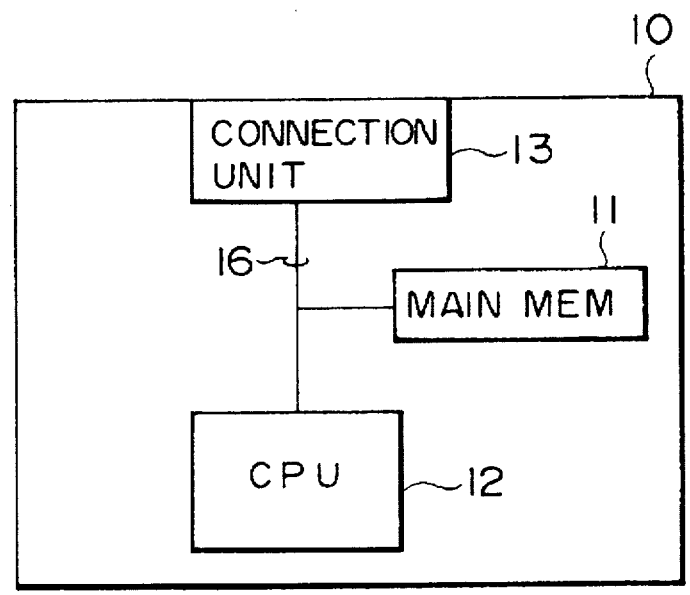
FIG. 3 is a system block diagram showing the construction of a processing module.

FIG. 3 shows the construction of the processing module 10. The processing module 10 at least includes a main memory 11, a CPU 12, and a connection unit (SBC) 13 for processing the connection to the system bus 20, which are coupled via an internal bus 16. The software of the processing module 10 is operated by the CPU 12 using the main memory 11, and a series of operations is carried out by mutual cooperation of the processes of the software as the software becomes the communication request source. The CPU 12 of the processing module 10 fetches the instruction codes from the main memory 11 and the like. In addition, an inherent unit number is assigned to the connection unit 13. Further, the internal bus 16 is made up of an address bus for indicating an access address, a data bus for transferring the data, and a control signal bus for transferring a plurality of control signals.

Figure 4:
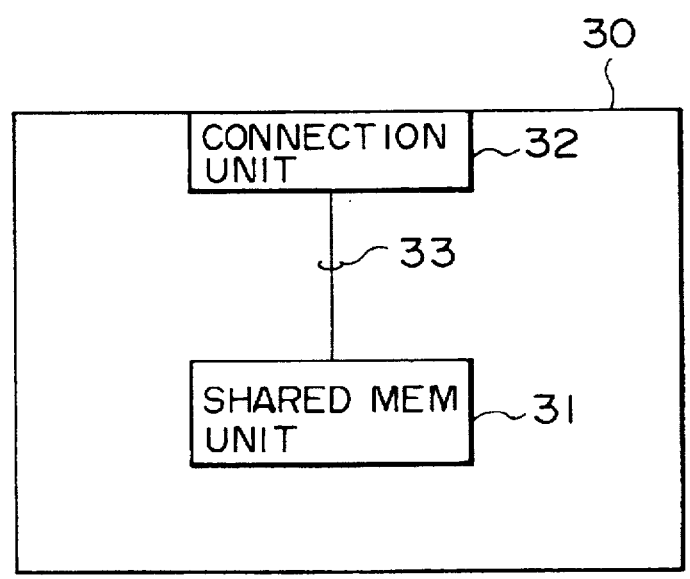
FIG. 4 is a system block diagram showing the construction of a shared memory module.

FIG. 4 shows the construction of the shared memory module 30. The shared memory module 30 at least includes a shared memory unit 31, a connection unit 32 for processing the connection to the system bus 20, which are coupled via an internal bus 33. The shared memory unit 31 stores the data which need to be used in common by the plurality of processing modules 10 shown in FIG. 2.

Figure 5:
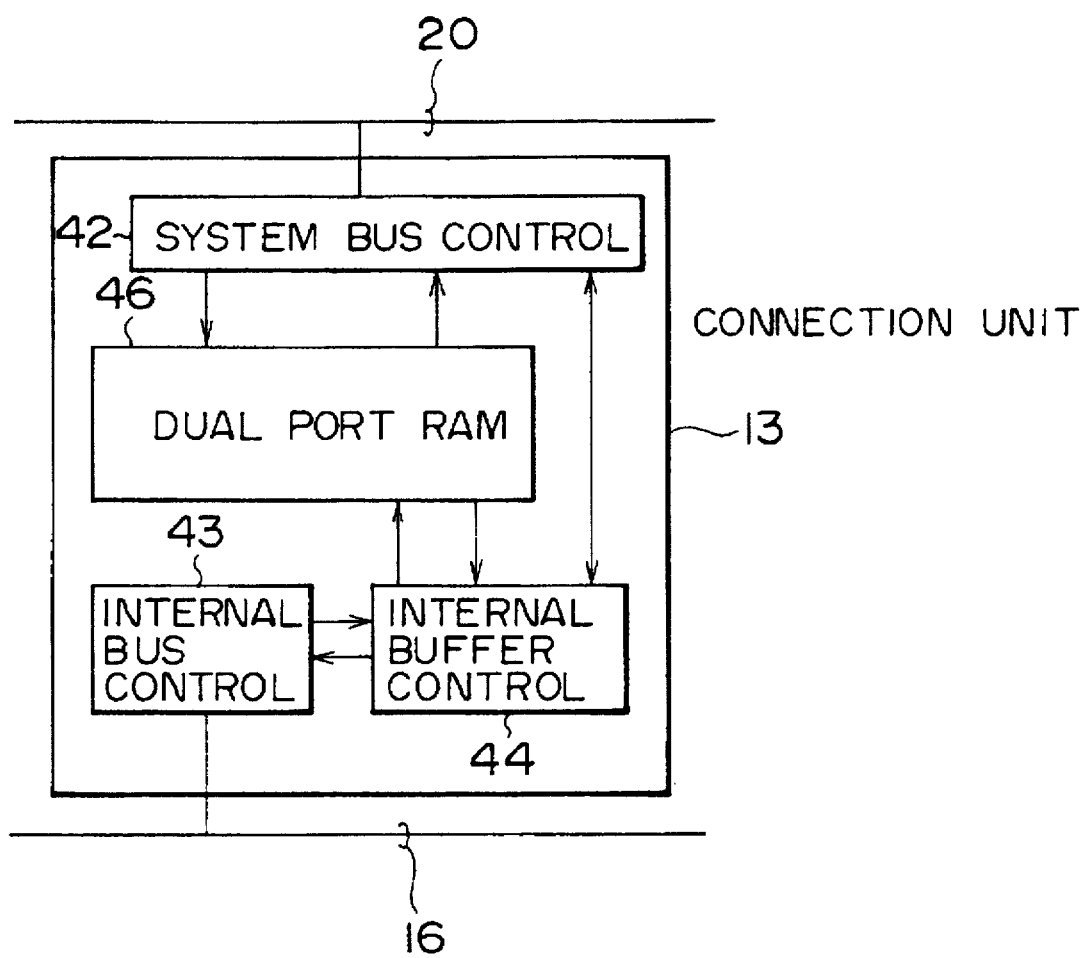
FIG. 5 is a system block diagram showing the construction of a connection unit within the processing module.

FIG. 5 shows the construction of the connection unit 13 within the processing module 10. In FIG. 5, those parts which are the same as those corresponding parts in FIGS. 1 through 3 are designated by the same reference numerals.

In FIG. 5, the connection unit 13 includes a dual port random access memory (RAM) 46, a system bus control circuit 42 connected to the system bus 20 for exchanging data between the dual port RAM 46 and the system bus 20, an internal bus control circuit 43 connected to the internal bus 16, and an internal buffer control circuit 44 for controlling the write, read and the like with respect to the dual port RAM 46. The dual port RAM 46 forms the internal buffer 41 described above.

Figure 6:
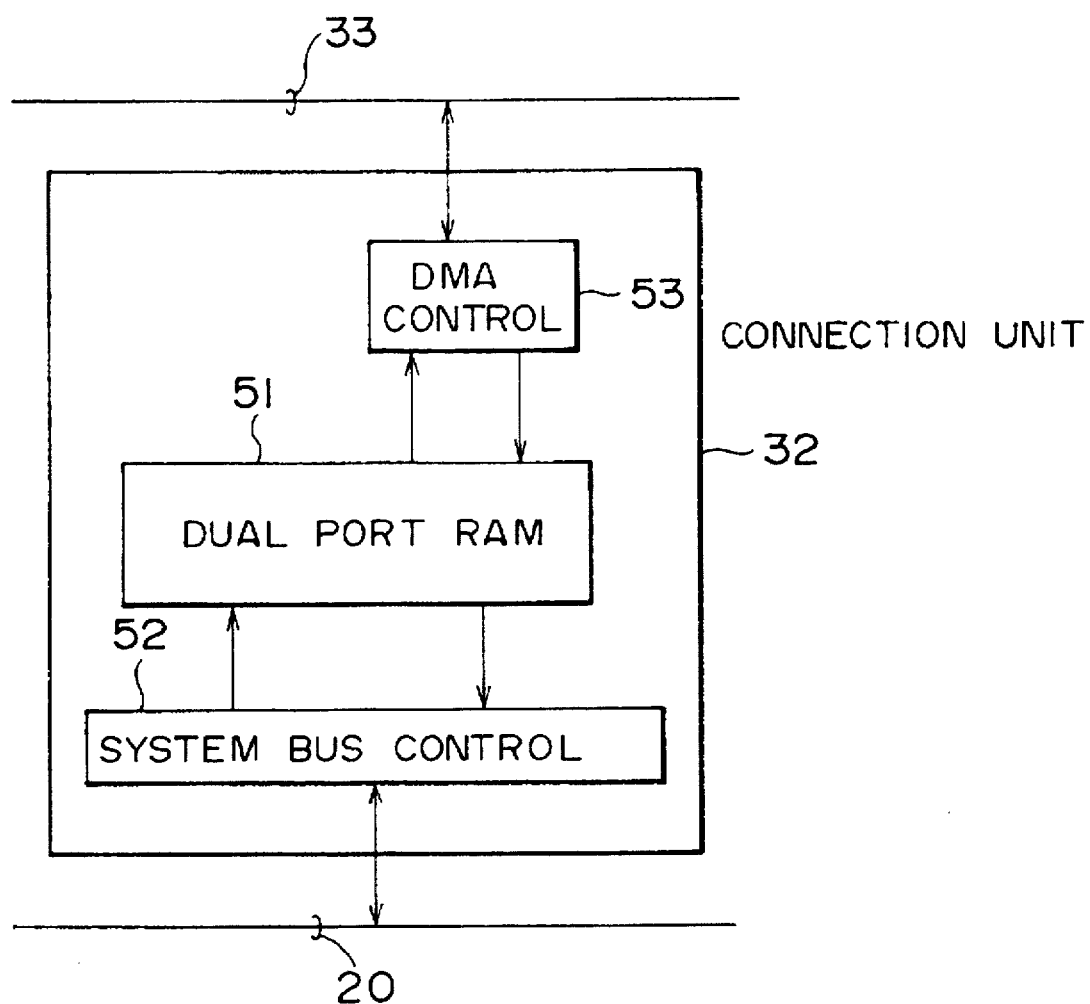
FIG. 6 is a system block diagram showing the construction of a connection unit within the shared memory module.

FIG. 6 shows the construction of the connection unit 32 within the shared memory module 30. In FIG. 6, those parts which are the same as those corresponding parts in FIGS. 1, 2 and 4 are designated by the same reference numerals.

In FIG. 6, the connection unit 32 includes a dual port RAM 51, a system bus control circuit 52 connected to the system bus 20 for exchanging data between the dual port RAM 51 and the system bus 20, and a direct memory access (DMA) control circuit 53 connected to the internal bus 33. The DMA control circuit 53 includes an internal bus control circuit (not shown) for controlling the internal bus 33, an address generator (not shown) for generating an address, and a timing control circuit (not shown) for controlling the operation timings.

The connection units 13 and 32 which connect the processing module 10 and the shared memory module 30 via the system bus 20 employ the split transfer system which splits one access to a start transfer and a response transfer. When carrying out the bus control according to the split transfer system, a unit identification (ID) is assigned for each module and the unit ID is regarded as a module identifier on the bus.

Figure 7:
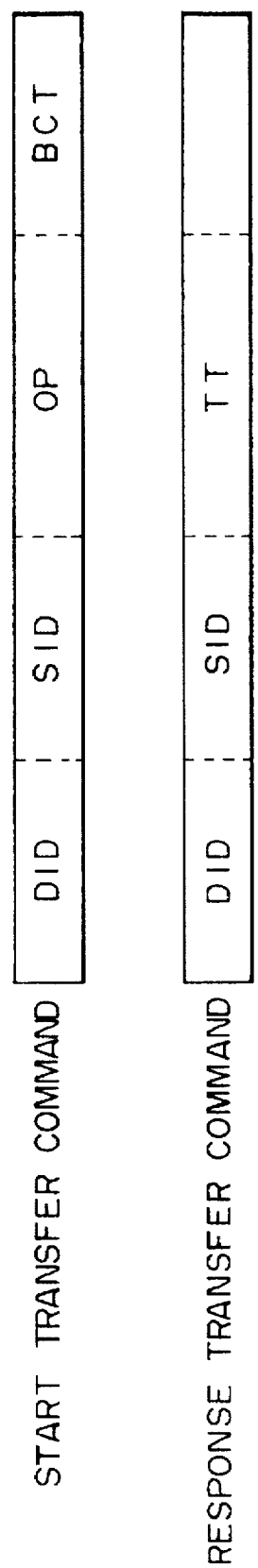
FIG. 7 is a diagram for explaining the format of a command used in the connection unit.

FIG. 7 shows the format of a start transfer command SC and a response transfer command EC which are used in the connection units 13 and 32. The start transfer command SC shown in FIG. 7 includes a destination identification (DID) code which indicates the unit ID of the destination module which is to receive, a source identification (SID) code which indicates the unit ID of the source module which is to transmit, an operand (OP) which indicates the kind of access, and a byte count (BCT) which indicates the data capacity of the access to the shared memory module 30. The kind of access includes a memory access with respect to the shared memory module 30, a halt instruction with respect to the shared memory module 30 or other processing modules 10, an access to a control register (not shown) such as a reset instruction, and the like.

On the other hand, the response transfer command EC shown in FIG. 7 includes the destination identification (DID) code, the source identification (SID) code, and a termination (TT) code which indicates the termination state at the accessed location, that is, whether a normal termination or an abnormal termination has occurred.

Figure 8:
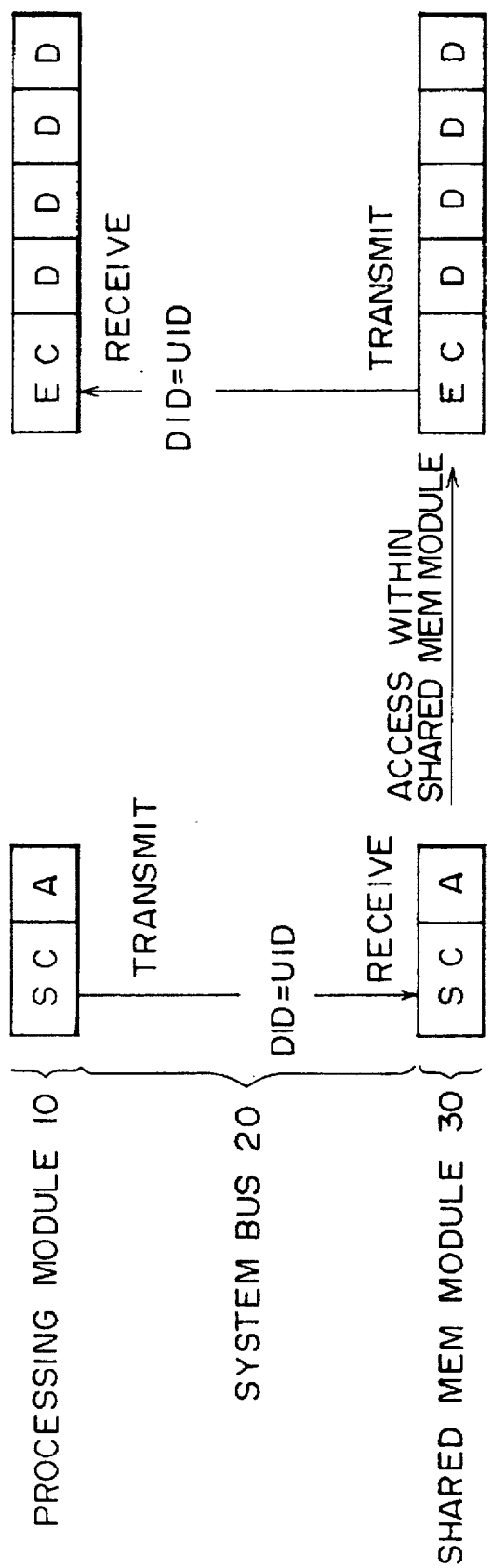
FIG. 8 is a diagram for explaining a read access operation of the shared memory module.

FIG. 8 is a diagram for explaining the read access (fetch access) operation when reading the data from the shared memory module 30 to the processing module 10. First, the connection unit 13 of the processing module 10 which is the access source forms the start transfer command SC. In other words, the connection unit 13 forms the start transfer command SC which is made up of the SID code indicating the unit ID of the processing module 10 to which this connection unit 13 belongs, the DID code which indicates the unit ID of the shared memory module 30 to which the access is to be made, the OP which indicates the kind of memory read access, and the BCT which indicates the access data capacity. An access address A of the shared memory module 30 to which the access is to be made is transmitted on the system bus 20 next to the start transfer command SC.

On the other hand, the connection unit 32 within the shared memory module 30 at the receiving end monitors the system bus 20, compares the DID code included in the start transfer command SC and the unit ID of the shared memory module 30 to which this connection unit 32 belongs, and carries out a receiving operation if the compared IDs match. The shared memory module 30 which carries out the receiving operation makes access to and reads from the shared memory unit 31 within the shared memory module 30 shown in FIG. 4. In addition, the shared memory module 30 transmits to the processing module 10 which is the access source the response transfer command EC and the read data D, including the TT code of the read access. Since the transfer direction is opposite between the start transfer and the response transfer, the DID code and the SID code are interchanged in the response transfer command EC when transmitting the response transfer command EC to the processing module 10.

The processing module 10 which is the access source monitors the system bus 20, and carries out a receiving operation if the DID code within the response transfer command EC and indicating the destination matches the unit ID of this processing module 10, thereby ending one read access. This read access may be carried out in one of two modes, namely, a program mode and a DMA mode. The operation on the system bus 20 is the same for the read access in either one of the two modes.

In the program mode, a direct access is made by a physical address in response to an instruction from the CPU 12 based on the software. On the other hand, in the DMA mode, the shared memory module 30 to which the access is to be made is selected, and the data transfer between the processing module 10 and the shared memory module 30 is started by specifying an access address and a transfer length.

In other words, in this embodiment, the physical address space of each processing module 10 is generally divided into a shared memory module space and a processing module inherent space. The shaped memory module space is directly mapped to the physical address space of each processing module 10.

The shared memory module space is an address space common to all of the processing modules 10, and is formed by the plurality of shared memory modules 30. A direct access to the shared memory module space can be made by the physical address of each processing module 10. Accordingly, only the data which are needed in common among all of the processing modules 10 are stored in the shared memory module 30.

On the other hand, the processing module inherent space is a space inherent to the hardware resource of each processing module 10, and is a multiple address space amounting to the carrying capacity of each processing module 10. Data such as the operand required by each processing module 10 and data inherent to each processing module 10 are stored in a portion of the processing module inherent space.

The program mode described above may employ the synchronous access which makes access in units of one word for one access instruction or, the asynchronous access system which makes access in units of blocks each made up of a plurality of words for one access instruction.

In this embodiment, it is assumed that the asynchronous access system is employed when reading from the shared memory module 30, similarly as in the case of the proposed asynchronous access system described above.

Figure 9:
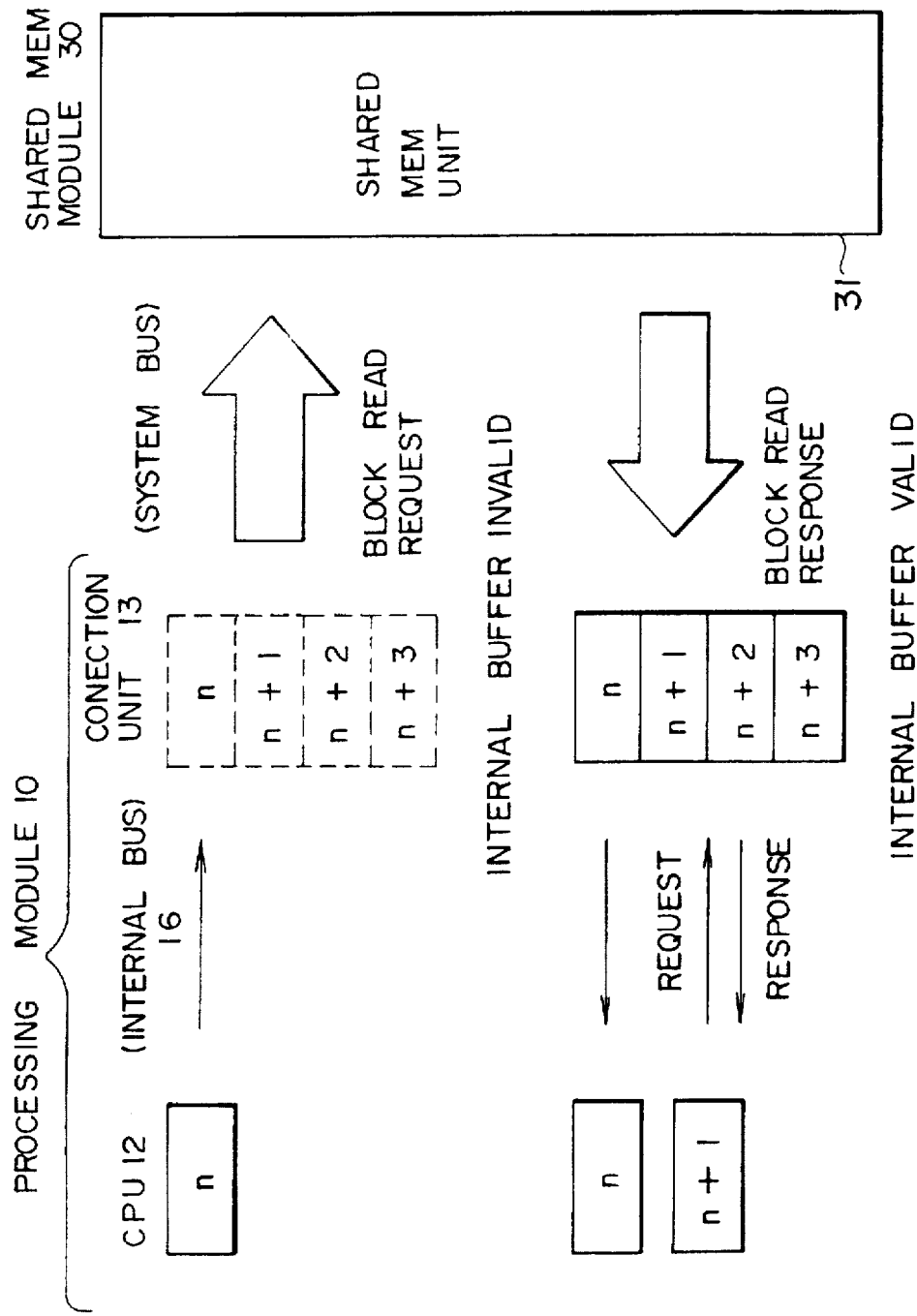
FIG. 9 is a diagram for explaining a read operation of the shared memory module in response to an asynchronous access.

A description will be given of the read sequence from the shared memory module 30 according to the asynchronous access system, by referring to FIG. 9. First, when the connection unit 13 within the processing module 10 recognizes the read request from the CPU 12 with respect to one word at an address n of the shared memory module 30, the connection unit 13 makes a block read request with respect to the shared memory module 30 via the system bus 20. In this embodiment, one block is made up of four words, and this block read request accordingly requests reading of four words at the addresses n, n+1, n+2 and n+3.

The shared memory module 30 which receives this block read request reads the data amounting to four words from the addresses n, n+1, n+2 and n+3 of the shared memory unit 31, and transmits the read data to the processing module 10 via the system bus 20. The one block of data from the shared memory module 30 is received by the connection unit 13 of the processing module 10, and is stored in the dual port RAM 46 within the connection unit 13. Out of the data stored in the dual port RAM 46, the data corresponding to the read request address n of the shared memory module 30 is transmitted to the CPU 12.

Next, when the CPU 12 issues the read request with respect to one word at the next address n+1 of the shared memory module 30, the connection unit 13 which recognizes this read request reads the data corresponding to the read request address n+1 already stored in the dual port RAM 46, and transmits the read data to the CPU 12.

Thereafter, when the CPU 12 issues successive read requests with respect to the addresses n+2 and n+3 of the shared memory module 30, the connection unit 13 does not carry out the series of operation including making the read request with respect to the shared memory module 30 and receiving the data read from the shared memory module 30. Instead, the connection unit 13 immediately reads the data corresponding to the read request addresses n+2 and n+3 already stored in the dual port RAM 46, and transmits the read data to the CPU 12. Hence, it is possible to respond at a high speed in response to the read requests from the CPU 12.

Figure 10:
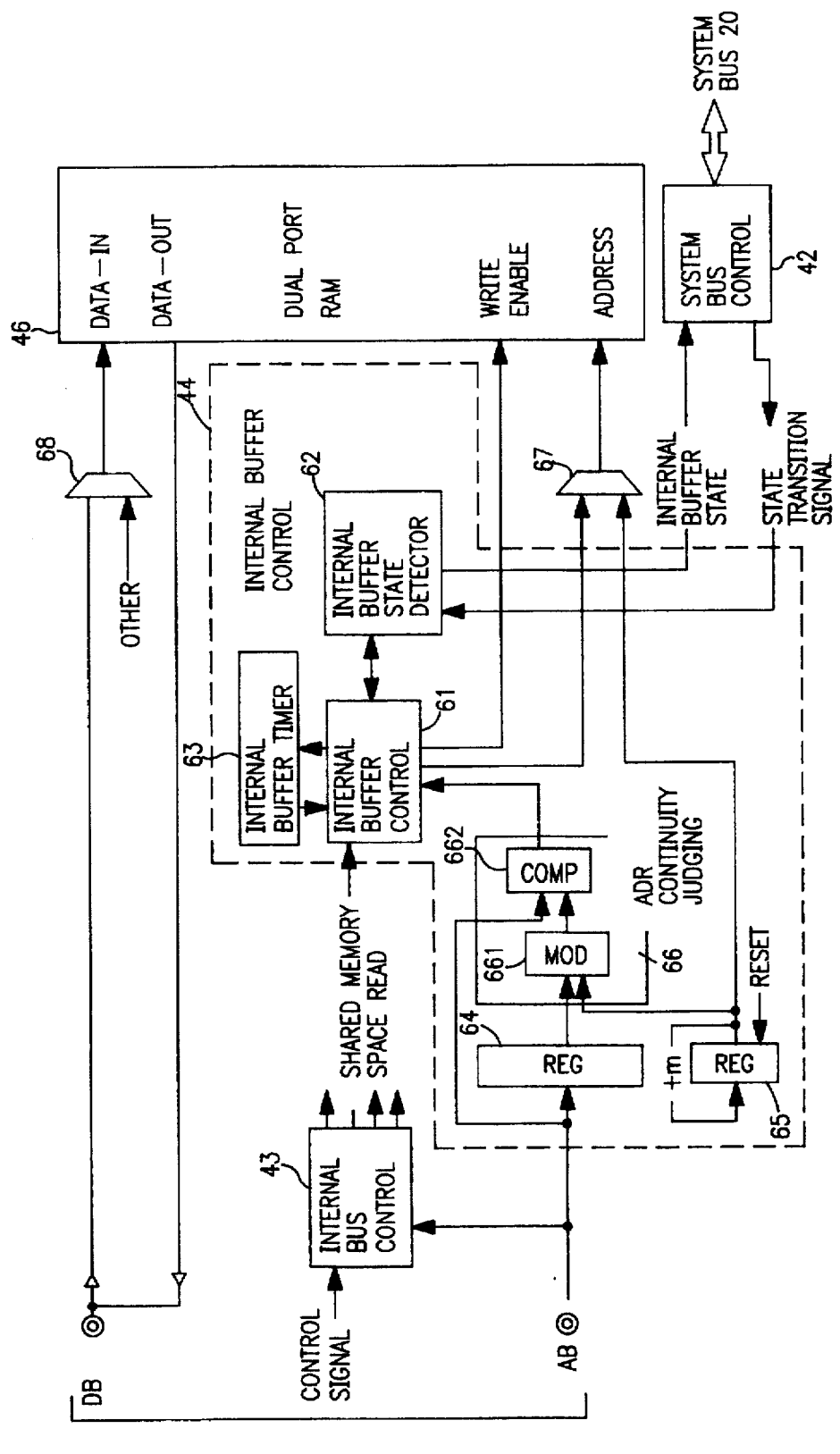
FIG. 10 is a system block diagram showing an essential part of an embodiment of an asynchronous access system according to the present invention.

In this embodiment, when making the block read operation from the shared memory module 30 according to the asynchronous access system, the content of the internal buffer 41, that is, the dual port RAM 46, is invalidated when necessary by the hardware of the connection unit 13 within the processing module 10. FIG. 10 shows the construction of an essential part of an embodiment of the asynchronous access system according to the present invention, and more particularly an essential part of the connection unit 13. In FIG. 10, those parts which are the same as those corresponding parts in FIG. 5 are designated by the same reference numerals, and a description thereof will be omitted.

In FIG. 10, the internal buffer control circuit 44 includes an internal buffer controller 61, an internal buffer stage detector 62, an internal buffer timer 63, an access start address holding register (AB-HOLD) 64, a byte count register (BCT) 65, and an address continuity judging circuit 66. The address continuity judging circuit 66 includes an adder 661 which adds outputs of the access start address holding register 64 and the byte count register 65, and a comparator 662 which determines whether or not an added output from the adder 661 and an address from an address bus AB match.

The internal buffer controller 61 transmits a control signal to a write enable terminal of the dual port RAM 46 and controls the read/write operation with respect to the dual port RAM 46. In addition, the internal buffer controller 61 transmits an address signal to a multiplexer 67 together with the output of the byte count register 65. An address signal which is selected by the multiplexer 67 is input to an address terminal of the dual port RAM 46.

A data bus DB which forms a portion of the internal bus 16 is connected to a data input terminal of the dual port RAM 46 via a multiplexer 68 on one hand, and is connected to a data output terminal of the dual port RAM 46 on the other. The internal bus control circuit 43 is connected to the address bus AB and a control signal bus which form a portion of the internal bus 16, and notifies the internal buffer controller 61 of the read address space of the shared memory module 30.

The internal buffer state detector 62 notifies the system bus control circuit 42 of the state of the dual port RAM 46 detected based on an output signal of the internal buffer controller 61. In addition, the internal buffer state detector 62 notifies the internal buffer controller 61 of the state transition based on an internal buffer state transition signal from the system bus control circuit 42.

In this embodiment, the internal buffer state may assume one of four kinds of states A, B, BR and EP. The available state A has no pending state, and indicates a state where a new access to the shared memory module 30 can be accepted. The busy state B indicates a state from the start of the read to the end of the access with respect to the shared memory module 30. The buffer ready state BR indicates a state where the read from the shared memory module 30 has normally ended and the content of the internal buffer (dual port RAM 46) is valid. Furthermore, the exception pending state EP indicates a state where the read from the shared memory module 30 has abnormally ended and an exception process is pending.

Figure 11:
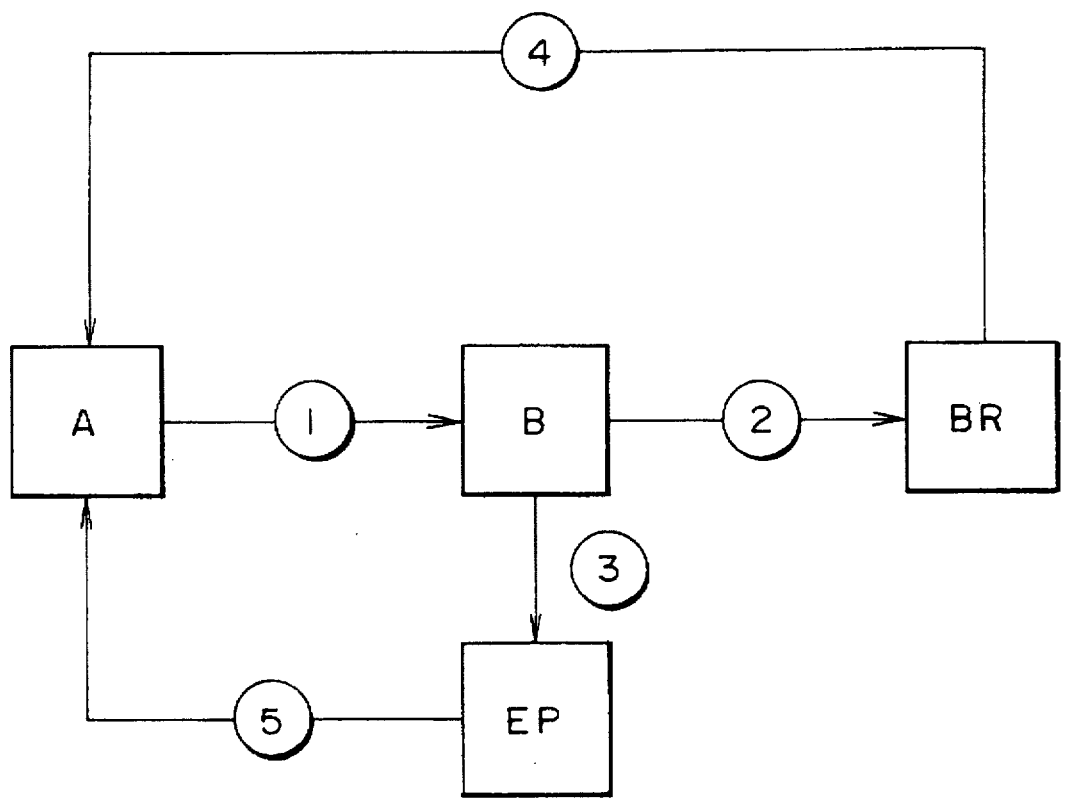
FIG. 11 is a state transition diagram for explaining an internal buffer.

The four kinds of internal buffer states are determined by the internal buffer control circuit 44 or the system bus control circuit 42, and the state transition occurs as shown in FIG. 11. If it is assumed that the internal buffer (dual port RAM 46) is in the available state A, the internal buffer state undergoes a transition to the busy state B as indicated by "1" in FIG. 11 when the internal buffer control circuit 44 recognizes the read access to the shared memory module 30.

On the other hand, if the system bus control circuit 42 recognizes the normal end of the read from the shared memory module 30, the internal buffer (dual port RAM 46) undergoes a state transition from the busy state B to the buffer ready state BR as indicated by "2" in FIG. 11. However, if the read from the shared memory module 30 ends abnormally, the system bus control circuit 42 causes the internal buffer (dual port RAM 46) to undergo a state transition from the busy state B to the exception pending state EP as indicated by "3" in FIG. 11.

In addition, if an invalidating instruction is received in the buffer ready state BR of the internal buffer (dual port RAM 46), a state transition is made to the available state A as indicated by "4" in FIG. 11. Furthermore, when the internal buffer (dual port RAM 46) is in the exception pending state EP, the CPU 12 generates a synchronous interrupt when an access is made to the shared memory module space, and a state transition is made to the available state A as indicated by "5" in FIG. 11.

Next, a description will be given of the operation of the connection unit 13 shown in FIG. 10.

It will be assumed for the sake of convenience that the dual port RAM 46 is in the available state A. When the internal bus control circuit 43 recognizes a read instruction from the CPU 12 shown in FIGS. 1 and 3 to the shared memory module 30 shown in FIGS. 1, 2 and 4 in this available state A, this recognizes read instruction is notified to the internal buffer controller 61. As a result, the internal buffer controller 61 changes the internal buffer state of the dual port RAM 46 to the busy state B. In addition, a read start address of the shared memory module 30 is stored in the access start address holding register 64. Further, the content of the byte count register 65 is reset.

Thereafter, the block read request for one block which is made up of four words each including four bytes, for example, at the read start address stored in the read start address holding register 64, is made with respect to the shared memory module 30 as described above. Hence, the data amounting to one block is read from the shared memory unit 31 and written into the dual port RAM 46.

In this state, the system bus control circuit 42 monitors the system bus 20. The system bus control circuit 42 detects whether a normal termination or an abnormal termination has occurred based on the TT code within the response transfer command EC which is addressed to the processing module 10 to which the system bus control circuit 42 belongs, and notifies the internal buffer state detector 62 of the detected termination state. The system bus control circuit 42 causes a state transition of the internal buffer state of the dual port RAM 46 to the buffer ready state BR if the normal termination is detected, and causes a state transition to the exception pending state EP if the abnormal termination is detected.

This embodiment is characterized by the invalidating function in the buffer ready state BR of the dual port RAM 46, and a description will now be given of this invalidating function.

The invalidating function includes: [1] the function of judging by the address continuity judging circuit 66 the continuity of the access address of the read instruction from the CPU 12; [2] the function of judging by the internal buffer controller 61 and the internal buffer timer 63 the non-execution of a read within a set time; and [3] the function of detecting by the internal bus control circuit 43 an instruction other than the read instruction.

First, a description will be given of the function [1] described above, that is, the operation of the address continuity judging circuit 66. When the data amounting to one block is stored in the dual port RAM 46 and the data amounting to one word at the read start address n is transmitted to the CPU 12, the byte count register 65 outputs m bytes which amounts to one word, where m=4 in this embodiment. The adder 661 adds the m bytes from the byte count register 65 and the read start address n from the read start address holding register 64. Hence, a next address n+1 is output from the adder 661.

Figure 12:
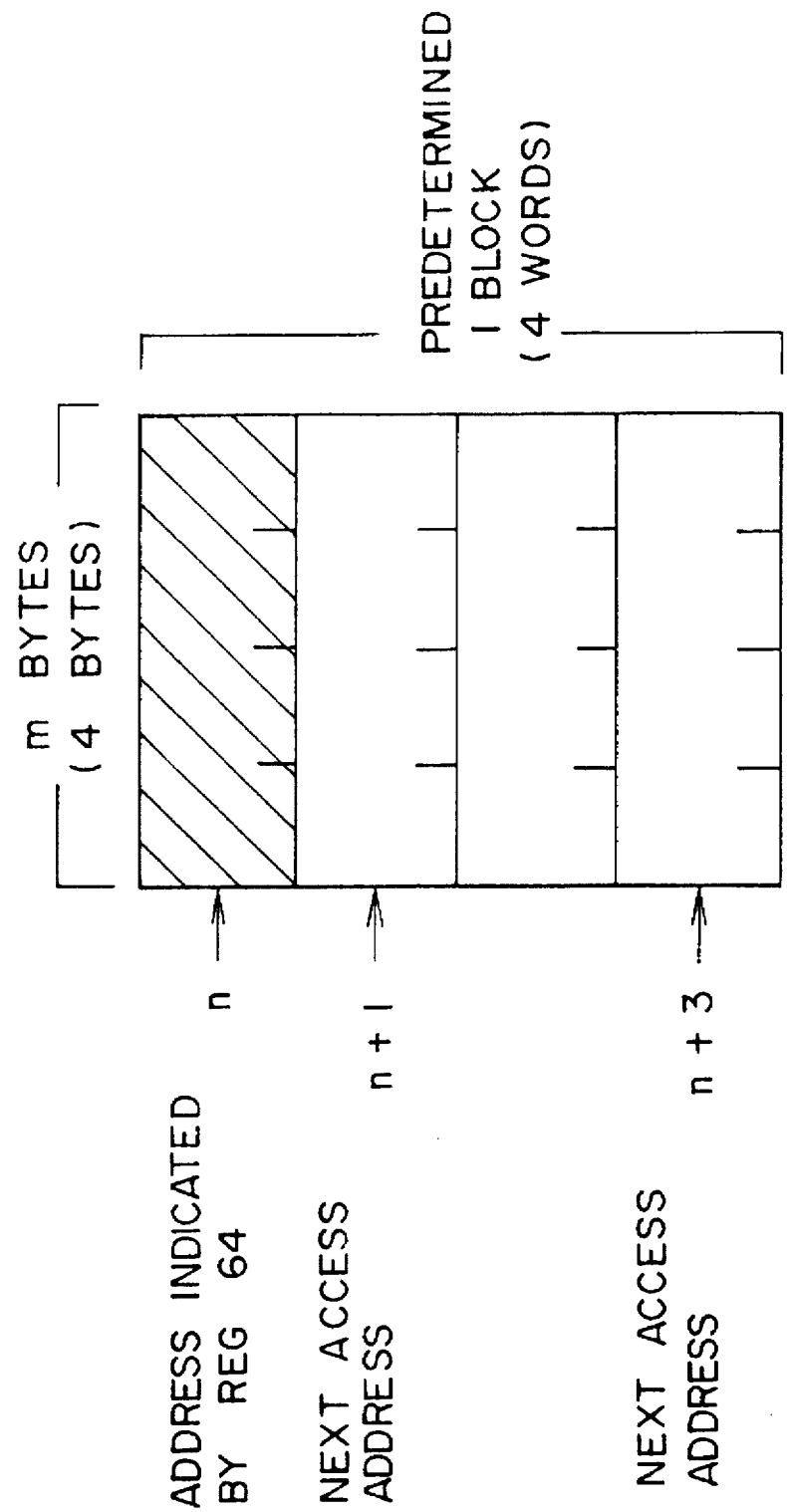
FIG. 12 is a diagram for explaining an address continuity judgement.

In this state, when the next read address n+1 is input from the CPU 12 via the address bus AB as shown in FIG. 12, the comparator 662 compares this read address n+1 and the output of the adder 661. The output of the adder 661 in this state indicates the address n+1, and thus, a coincidence signal which indicates that the compared addresses match is output from the comparator 662 and input to the internal buffer controller 61.

Accordingly, the internal buffer controller 61 judges that the address has continuity, and inputs the next address n+1 to the address terminal of the dual port RAM 46, so as to transmit the data amounting to one word to the CPU 12 via the data bus DB. When this data amounting to one word is read, m is further input to the byte count register 65 and the stored content of the byte count register 65 consequently becomes 2 m.

Then, if it is assumed that the address n+3 and not the address n+2 which is next to the address n+1 is input from the CPU 12 as shown in FIG. 12, the comparator 662 compares this input address n+3 and the output address n+2 m of the adder 661. Hence, the comparator 662 compares the output of the adder 661 with the address n+3 which is next to the intrinsic address n+2, and a no-coincidence signal which indicates that the compared addresses do not match is output from the comparator 662.

Hence, the internal buffer controller 61 judges that the address has no continuity, and causes the input buffer state of the dual port RAM 46 to make a state transition to the available state A, that is, invalidates the content of the dual port RAM 46. If the reading of the data amounting to one block from the dual port RAM 46 ends while maintaining the address continuity, the output of the adder 661 indicates the address which is next to the final address of this one block. Hence, the no-coincidence signal is output from the comparator 662, and the input buffer state of the dual port RAM 46 is changed to the available state A.

Figure 13:
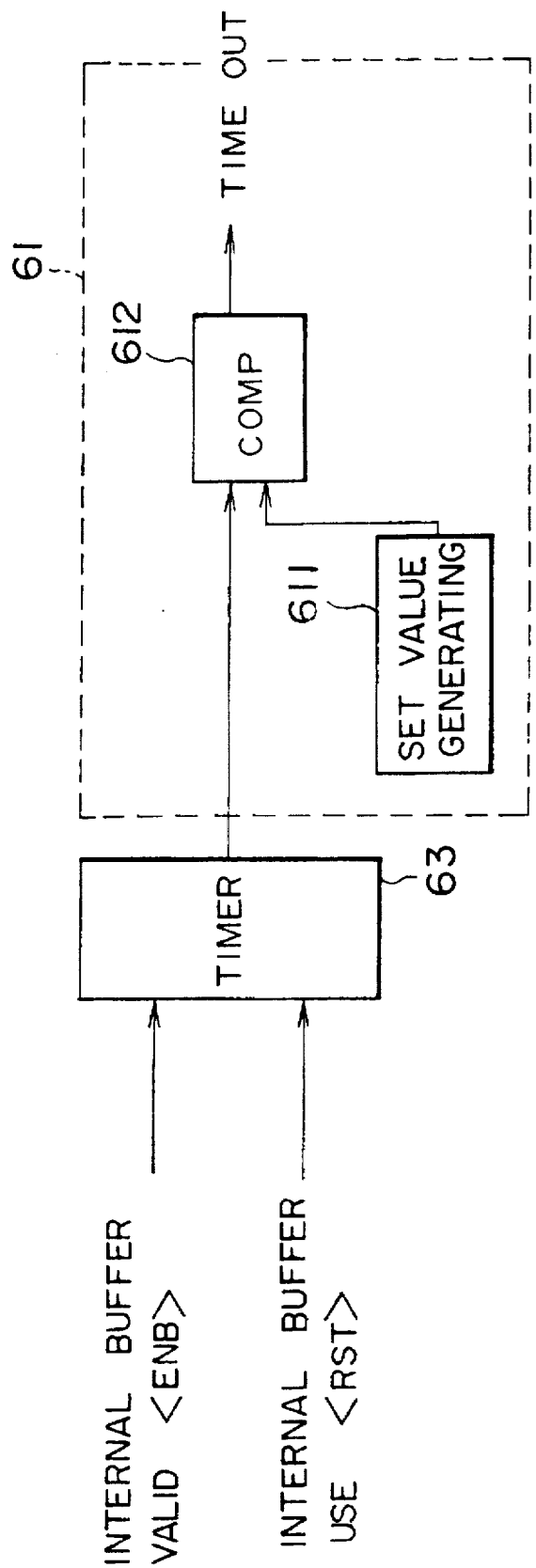
FIG. 13 is a system block diagram showing an essential part of an embodiment of an internal buffer controller.

Next, a description will be given of the function [2] described above. A portion of the internal buffer controller 61 is formed to compare the outputs of the internal buffer timer 63 and a set value generating circuit 611 in a comparator 612, as shown in FIG. 13. The internal buffer timer 63 starts the count when an enable terminal thereof receives a signal which indicates that the internal state of the dual port RAM 46 has undergone a state transition to the buffer ready state BR by the operation of the internal buffer controller 61.

In addition, the internal buffer timer 63 is reset every time the data of the shared memory unit stored in the dual port RAM 46 is read by the CPU 12, and thereafter starts to count again. Accordingly, the output value of the internal buffer timer 63 is normally less than the output set value of the set value generating circuit 611, and no time-out signal is output from the comparator 612.

However, when a time indicated by the set value elapses from the time when the internal buffer timer 63 starts the count, that is, from the time when the final read instruction is executed, the output value of the internal buffer timer 63 becomes greater than or equal to the set value, and a time-out signal is output from the comparator 612. This time-out signal is output to a predetermined portion within the internal buffer controller 61, so as to put the dual port RAM 46 into the available state A, because it may be judged that the series of data processing has ended.

Figure 14:
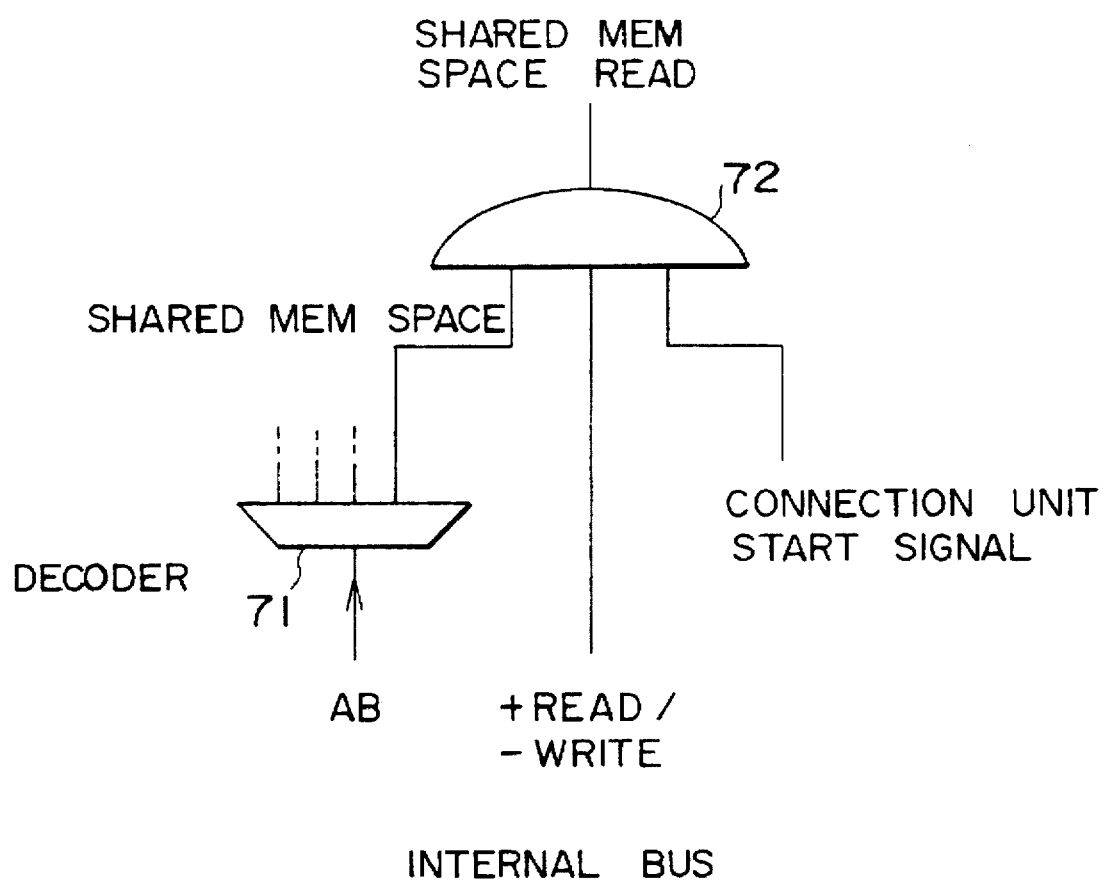
FIG. 14 is a circuit diagram showing an embodiment of an essential part of an internal bus control circuit.

Next, a description will be given of the function [3] described above. As shown in FIG. 14, the internal bus control circuit 43 includes at least a decoder 71 and a gate circuit 72, the decoder 71 decodes the address which is input from the CPU 12 via the address bus AB, and inputs the address of the shared memory module space to the gate circuit 72.

The gate circuit 72 receives a connection unit start signal of the control signal from the internal bus 16, the address signal described above, and a signal from the CPU 12 indicating the read/write, and obtains a logical product of these signals. The gate circuit 72 outputs a signal having a different logic level between a case where the connection unit 13 receives the read instruction from the CPU 12 with respect to the shared memory module 30 and a case other than this case.

The output signal of the gate circuit 72 is input to the internal buffer controller 61, and the content of the dual port RAM 46 is invalidated, that is, the dual port RAM 46 is put into the available state, when executing an instruction from the CPU 12 other than the read instruction with respect to the shared memory module 30, because it may be judged in this case that the series of data read processes has ended. For example, the instruction other than the read instruction may be a write instruction with respect to the shared memory module 30.

According to this embodiment, the invalidation of the content of the dual port RAM 46 by the internal buffer control circuit 44 or the internal bus control circuit 43 can be realized in a plurality of cases, and it is thus possible to reduce the overhead of the software of the CPU 12 which carries out the invalidation process by the software.

Of course, the set value of the set value generating circuit 611 shown in FIG. 13 may be arbitrarily varied externally. In addition, it is possible to invalidate the content of the dual port RAM 46 in response to an invalidating instruction from the CPU 12 with respect to the dual port RAM 46.

Further, the present invention is not limited to these embodiments, but various variations and modifications may be made without departing from the scope of the present invention.

What is claimed is:

1. An asynchronous access system comprising:
   a system bus;
   at least one shared memory module provided with a shared memory unit and a second connection unit which connects to said system bus;
   at least one processing module provided with a main memory, a central processing unit, a first connection unit which connects to said system bus, and an internal bus connecting said main memory, said central processing unit and said first connection unit, said first connection unit adapted to issue a block read request to said shared memory module via said system bus when said first connection unit recognizes that said central processing unit has requested a read from said shared memory module, said first connection unit comprising:
   an internal buffer for storing data read from said shared memory module;
   a system bus control circuit coupled to said system bus;
   an internal bus control circuit coupled to said internal bus; and
   an internal buffer control circuit controlling writing and reading of said internal buffer based on a signal from said internal bus control circuit, said internal buffer control circuit includes a timer circuit means for judging whether said central processing unit executed a read with respect to said internal buffer within a set time from execution of a final read instruction from said central processing unit, said internal buffer control circuit invalidating the content of said internal buffer when said timer circuit means judges that the read is not executed within said set time,
   one of said internal buffer control circuit and said internal bus control circuit invalidating a content of said internal buffer when an invalidating condition is recognized.

2. The asynchronous access system as claimed in claim 1, wherein said timer circuit means includes means for arbitrarily varying said set time.

3. An asynchronous access system comprising:
   a system bus;
   at least one shared memory module provided with a shared memory unit and a second connection unit which connects to said system bus;
   at least one processing module provided with a main memory, a central processing unit, a first connection unit which connects to said system bus, and an internal bus connecting said main memory, said central processing unit and said first connection unit, said first connection unit adapted to issue a block read request to said shared memory module via said system bus when said first connection unit recognizes that said central processing unit has requested a read from said shared memory module;
   said first connection unit comprising:
   an internal buffer for storing data read from said shared memory module;
   a system bus control circuit coupled to said system bus;
   an internal bus control circuit coupled to said internal bus;
   an internal buffer control circuit controlling writing and reading of said internal buffer based on a signal from said internal bus control circuit; and
   an internal state buffer detector, connected between said internal buffer control circuit and said system bus control circuit, which monitors the output of said internal buffer control circuit and said system bus control circuit and indicates the state of said internal buffer to said system bus control circuit and indicates a state of transition to said internal buffer control circuit,
   one of said internal buffer control circuit and said internal bus control circuit invalidating a content of said internal buffer when an invalidating condition is recognized.

4. The asynchronous access system as claimed in claim 3, wherein said internal buffer control circuit includes a circuit means for judging whether a subsequent access address of a read instruction from said central processing unit is sequential with respect to a prior access address and for invalidating the content of said internal buffer when the subsequent access address is not sequential with respect to the prior access address.

5. The asynchronous access system as claimed in claim 3, wherein said internal buffer comprises a dual port random access memory.

6. The asynchronous access system as claimed in claim 3, wherein said shared memory module stores used in common by a plurality of said processing modules.

7. The asynchronous access system as claimed in claim 3, wherein said internal bus control circuit includes detecting circuit means for detecting an instruction other than a read instruction received from said central processing unit via said first connection unit, said internal bus control circuit invalidating the content of said internal buffer when said detecting circuit means detects an instruction other than the read instruction.

8. The asynchronous access system as claimed in claim 7, wherein the instruction other than the read instruction includes a write instruction from said central processing unit.

* * * * *